(12) United States Patent
Conti et al.

(10) Patent No.: US 11,068,787 B2
(45) Date of Patent: Jul. 20, 2021

(54) TRAINING NEURAL NETWORKS USING EVOLUTION BASED STRATEGIES AND NOVELTY SEARCH

(71) Applicant: Uber Technologies, Inc., San Francisco, CA (US)

(72) Inventors: Edoardo Conti, San Francisco, CA (US); Vashisht Madhavan, San Francisco, CA (US); Jeffrey Michael Clune, San Francisco, CA (US); Felipe Petroski Such, San Francisco, CA (US); Joel Anthony Lehman, San Francisco, CA (US); Kenneth Owen Stanley, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 141 days.

(21) Appl. No.: 16/220,533

(22) Filed: Dec. 14, 2018

(65) Prior Publication Data

US 2019/0188571 A1    Jun. 20, 2019

Related U.S. Application Data

(60) Provisional application No. 62/778,237, filed on Dec. 11, 2018, provisional application No. 62/599,611, filed on Dec. 15, 2017.

(51) Int. Cl.
*G06N 3/08*     (2006.01)
*G06N 3/04*     (2006.01)
*G06N 5/04*     (2006.01)

(52) U.S. Cl.
CPC ........... *G06N 3/084* (2013.01); *G06N 3/0454* (2013.01); *G06N 3/0472* (2013.01); *G06N 5/043* (2013.01)

(58) Field of Classification Search
CPC ........ G06N 3/0454; G06N 20/00; G06N 3/08; G06N 3/02; G06N 3/084; G06N 3/126
See application file for complete search history.

(56) References Cited

U.S. PATENT DOCUMENTS 9,424,514 B2     8/2016    Weng et al.
2006/0047612 A1*  3/2006   Stanley .................. G06N 20/00
                                                                706/16

(Continued)

FOREIGN PATENT DOCUMENTS

EP           3 242 255 A1      11/2017
WO      WO 2017-148536 A1       9/2017

OTHER PUBLICATIONS

Salimans, T., Ho, J., Chen, X., Sidor, S., & Sutskever, I. (2017). Evolution strategies as a scalable alternative to reinforcement learning. arXiv preprint arXiv: 1703.03864. (Year: 2017).*

(Continued)

*Primary Examiner* — Baboucarr Faal
*Assistant Examiner* — Oluwatosin O Alabi
(74) *Attorney, Agent, or Firm* — Fenwick & West LLP (57) ABSTRACT

Systems and methods are disclosed herein for selecting a parameter vector from a set of parameter vectors for a neural network and generating a plurality of copies of the parameter vector. The systems and methods generate a plurality of modified parameter vectors by perturbing each copy of the parameter vector with a different perturbation seed, and determine, for each respective modified parameter vector, a respective measure of novelty. The systems and methods determine an optimal new parameter vector based on each respective measure of novelty for each respective one of the plurality of modified parameter vectors, and determine behavior characteristics of the new parameter vector. The (Continued)

systems and methods store the behavior characteristics of the new parameter vector in an archive.

18 Claims, 7 Drawing Sheets

(56) References Cited

U.S. PATENT DOCUMENTS

| | | | |
|---|---|---|---|
| 2008/0172177 A1* | 7/2008 | Sherony | G06K 9/00805 701/301 |
| 2010/0138372 A1 | 6/2010 | Palmer | |
| 2016/0358071 A1 | 12/2016 | Grefenstette et al. | |

OTHER PUBLICATIONS

Lehman, J., & Stanley, K. O. (Jun. 2011). Improving evolvability through novelty search and self-adaptation. In 2011 IEEE congress of evolutionary computation (CEC) (pp. 2693-2700). IEEE. (Year: 2011).*
Jung, T., Wehenkel, L., Ernst, D., & Maes, F. (2014). Optimized look-ahead tree policies: a bridge between look-ahead tree policies and direct policy search. International Journal of Adaptive Control and Signal Processing, 28(3-5), 255-289. (Year: 2014).*
Galassi, M., Capodieci, N., Cabri, G., & Leonardi, L. (Oct. 2016). Evolutionary strategies for novelty-based online neuroevolution in swarm robotics. In 2016 IEEE International Conference on Systems, Man, and Cybernetics (SMC) (pp. 002026-002032). IEEE. (Year: 2016).*
Khadka, S., Turner, K., Colby, M., Tucker, D., Pezzini, P., & Bryden, K. (Jul. 2016). Neuroevolution of a hybrid power plant simulator. In Proceedings of the Genetic and Evolutionary Computation Conference 2016 (pp. 917-924). (Year: 2016).*
Conti, E., Madhavan, V., Such, F. P., Lehman, J., Stanley, K. O., & Clune, J. (2017). Improving exploration in evolution strategies for deep reinforcement learning via a population of novelty-seeking agents. arXiv preprint arXiv: 1712.06560. (Year: 2017).*
Bellemare, M. et al., "Unifying count-based exploration and intrinsic motivation," 30th Conference on Neural Information Processing Systems (NIPS 2016), Dec. 2016, pp. 1471-1479.
Bellemare, M. et al., "The arcade learning environment: An evaluation platform for general agents," J. Artif Intell. Res., vol. 47, Jun. 2013, pp. 253-279.
Brockman, G. et al., "OpenAI gym," Jun. 5, 2016, pp. 1-4.
Cully, A. et al., "Behavioral repertoire learning in robotics," GECCO '13, Jul. 2013, pp. 175-182.
Cully, A. et al., "Robots that can adapt like animals," Nature, vol. 521, May 2015, pp. 503-507.
Dauphin, Y. et al., "Identifying and attacking the saddle point problem in high-dimensional nonconvex optimization," Jun. 10, 2014, pp. 1-14.
Fortunato, M. et al., "Noisy networks for exploration," Sixth International Conference on Learning Representations, May 2018, pp. 1-21.
French, R., "Catastrophic forgetting in connectionist networks," Trends in cognitive sciences, vol. 3, Iss. 4, Apr. 1999, pp. 128-135.
Houthooft, R. et al., "VIME: Variational information maximizing exploration," 30th Conference on Neural Information Processing Systems (NIPS 2016), Dec. 2016, pp. 1109-1117.
Huizinga, J. et al., "Does aligning phenotypic and genotypic modularity improve the evolution of neural networks?," Proceedings of the 2016 on Genetic and Evolutionary Computation Conference, Jul. 2016, pp. 125-132.
Ioffe, S. et al., "Batch normalization: Accelerating deep network training by reducing internal covariate shift," International Conference on Machine Learning, Jul. 2015, pp. 448-456.
Jaderberg, M. et al., "Population based training of neural networks," Nov. 2017, pp. 1-21.
Kawaguchi, K., "Deep learning without poor local minima," 30th Conference on Neural Information Processing Systems (NIPS 2016), Dec. 2016 pp. 586-594.
Kingma, D. et al., "Auto-encoding variational bayes," Dec. 2013, pp. 1-9.
Kingma, D. et al., "Adam: A method for stochastic optimization," International Conference on Learning Representations, May 2015, pp. 1-15.
Kirkpatrick, J. et al., "Overcoming catastrophic forgetting in neural networks," Proceedings of the National Academy of Sciences, vol. 114, No. 13, Mar. 28, 2017, pp. 3521-3526.
Lange, S. et al., "Deep auto-encoder neural networks in reinforcement learning," International Joint Conference on Neural Networks (IJCNN), Jul. 2010, pp. 1-8.
Lehman, J. et al., "Abandoning objectives: Evolution through the search for novelty alone," Evolutionary Computation, vol. 19, No. 2, May 2011, pp. 189-223.
Lehman, J. et al., "Evolving a diversity of virtual creatures through novelty search and local competition," GECCO '11: Proceedings of the 13th Annual Conference on Genetic and Evolutionary Computation, Jul. 2011, pp. 211-218.
Lehman, J. et al., "Novelty search and the problem with objectives," Genetic Programming Theory and Practice IX (GPTP 2011), Chapter 1, Oct. 2011, pp. 37-56.
Liepins, G. et al., "Deceptiveness and genetic algorithm dynamics," Technical Report CONF-9007175-1, Nov. 7, 1990, pp. 1-13.
Miikkulainen, R. et al., "Evolving deep neural networks," arXiv preprint arXiv:1703.00548v2, Mar. 4, 2017, pp. 1-8.
Mnih, V. et al., "Asynchronous methods for deep reinforcement learning," International Conference on Machine Learning, Jun. 2016, pp. 1928-1937.
Mnih, V. et al., "Human-level control through deep reinforcement learning," Nature, vol. 518, Iss. 7540, Feb. 2015, pp. 529-533.
Mnih, V. et al., "Playing atari with deep reinforcement learning," arXiv preprint arXiv:1312.5602, Dec. 19, 2013, pp. 1-9.
Mouret, J. et al., "Illuminating search spaces by mapping elites," arXiv preprint arXiv:1504.04909, Apr. 21, 2015, pp. 1-15.
Naddaf, Y., Game-Independent AI Agents for Playing Atari 2600 Console Games, Spring 2010, pp. 1-68.
Ostrovski, G. et al., "Count-Based Exploration with Neural Density Models," Proceedings of the 34th International Conference on Machine Learning, Aug. 2017, pp. 1-15.
Oudeyer, P. et al., "What is Intrinsic Motivation? A Typology of Computational Approaches," Frontiers in Neurorobotics, vol. 1, Article 6, Nov. 2007, pp. 1-14.
Paquette, P., "Super Mario Bros. in Openai Gym," three pages, 2016, [Online] [Retrieved on May 14, 2019] Retrieved from the Internet <URL: https://github.com/ppaquette/gym-super-mario>.
Pathak, D. et al., Curiosity-Driven Exploration by Self-Supervised Prediction. ICML 2017, Aug. 2017, pp. 16-17.
PCT International Search Report and Written Opinion, PCT Application No. PCT/IB2018/060143, dated Apr. 12, 2019, nine pages.
Petroski S. et al., "Deep Neuroevolution: Genetic Algorithms are a Competitive Alternative for Training Deep Neural Networks for Reinforcement Learning," Apr. 20, 2018, pp. 1-16.
Pugh, J. et al., "Confronting the Challenge of Quality Diversity," Proceedings of the 17th Annual Conference on Genetic and Evolutionary Computation, Jul. 2015, pp. 967-974.
Pugh, J. et al., "Quality diversity: A new frontier for evolutionary computation," Frontiers in Robotics and AI, vol. 3, Article 40, Jul. 2016, pp. 1-17.
Rechenberg, I., "Evolutionsstrategien," Simulationsmethoden in der Medizin and Biologie, 1978, pp. 83-114, (with concise explanation of relevance).
Rusu, A. et al., "Policy distillation," arXiv preprint arXiv:1511.06295, Jan. 7, 2016, pp. 1-13.
Salimans, T. et al., "Evolution strategies as a scalable alternative to reinforcement learning," arXiv preprint arXiv:1703.03864, Sep. 7, 2017, pp. 1-13.
Salimans, T. et al., "Improved techniques for training gans," Advances in Neural Information Processing Systems, Dec. 2016, pp. 2234-2242.

(56) References Cited

OTHER PUBLICATIONS

Schmidhuber, J. et al., "Formal Theory of Creativity, Fun, and Intrinsic Motivation (1990-2010)," IEEE Transactions on Autonomous Mental Development, vol. 2, No. 3, Sep. 2010, pp. 230-247.
Schulman, J. et al., "Trust region policy optimization," Proceedings of the 32nd International Conference on Machine Learning, Jul. 2015, pp. 1889-1897.
Sehnke, F. et al., "Parameter-exploring policy gradients," Neural Networks, vol. 23, Iss. 4, May 2010, pp. 551-559.
Stadie, B. et al., "Incentivizing Exploration in Reinforcement Learning with Deep Predictive Models," arXiv preprint arXiv:1507.00814, Nov. 19, 2015, pp. 1-11.
Stanton, C. et al., "Curiosity Search: Producing Generalists by Encouraging Individuals to Continually Explore and Acquire Skills Throughout Their Lifetime," PloS ONE, 11(9), Sep. 2, 2016, e0162235, pp. 1-20.
Sutton, R. et al., "Reinforcement learning: An introduction," MIT press Cambridge, 2014, pp. 1-338.
Tang, H. et al., "#Exploration: A Study of Count-Based Exploration for Deep Reinforcement Learning," 31st Conference on Neural Information Processing Systems (NIPS 2017), Dec. 2017, pp. 2750-2759.
Van Den Oord, A. et al., "Conditional Image Generation with PixelCNN Decoders," 30th Conference on Neural Information Processing Systems (NIPS 2016), Dec. 2016, pp. 4790-4798.
Velez, R. et al., "Diffusion-Based Neuromodulation Can Eliminate Catastrophic Forgetting in Simple Neural Networks," PloS ONE 12(11), Nov. 16, 2017, pp. 1-24.
Velez, R. et al., "Novelty Search Creates Robots with General Skills for Exploration," Proceedings of the 2014 Conference on Genetic and Evolutionary Computation, GECCO '14, Jul. 2014, pp. 737-744.
Wierstra, D. et al., "Natural evolution strategies," 2008 IEEE Congress on Evolutionary Computation (IEEE World Congress on Computational Intelligence), Jun. 2008, pp. 3381-3387.
Williams, R., "Simple statistical gradient-following algorithms for connectionist reinforcement learning," Machine learning, vol. 8, Issue 3-4, May 1992, pp. 229-256.

\* cited by examiner

TRAINING NEURAL NETWORKS USING EVOLUTION BASED STRATEGIES AND NOVELTY SEARCH

CROSS-REFERENCE TO RELATED APPLICATIONS

The instant application claims the benefit of U.S. Provisional Patent Application No. 62/599,611, filed Dec. 15, 2017, and U.S. Provisional Patent Application No. 62/778,237, filed Dec. 11, 2018, the disclosures of which is hereby incorporated by reference herein in their entireties.

BACKGROUND

1. Technical Field

The subject matter described generally relates to artificial neural networks, and in particular to training artificial neural networks using evolution based strategies and novelty search.

2. Background Information

Neural networks are used for performing complex tasks, for example, natural language processing, computer vision, speech recognition, bioinformatics, recognizing patterns in images, and so on. A neural network is represented as a set of interconnected nodes. A neural network may comprise millions of parameters representing weights of the interconnections between nodes. Certain techniques for training neural networks explore a parameter space for values for weights of the neural network so as to maximize a measure of reward. The measure of reward can often be very sparse or deceptive. Thus, these techniques for exploring the parameter space for a neural network often get stuck in a local optima or end up with very large divergence. As a result these techniques are often inadequate and fail to determine the correct weights for a neural network.

SUMMARY

Systems and methods are disclosed herein for improving exploration in evolution strategies for deep reinforcement learning by way of a population of novelty-seeking agents. For example, optimizing for reward only can often lead an agent to local optima. A novelty search, however, awards deception in a reward signal by ignoring reward, and instead encourages policies to engage in notably different behaviors than those previously seen. The systems and methods disclosed herein encourage different behaviors by computing the novelty of a current policy with respect to previously generated policies, and also encourages the population distribution to move towards areas of parameter space with high novelty.

An example of where a novelty search outperforms a reward-based search is a maze scenario; a reward-based search where a reward is given for making it closer to an end goal may cause a robot in the maze to get stuck at a wall in the maze, because completing the maze may require first moving further from the goal, which would reduce the reward if the robot has to move away from the wall in order to ultimately reach the end goal. Techniques disclosed can be used for navigating other types of devices with mobility capabilities such autonomous vehicles. In some embodiments, a hybrid novelty search and reward search may be performed to optimize performance.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

Example Systems

Figure 1:
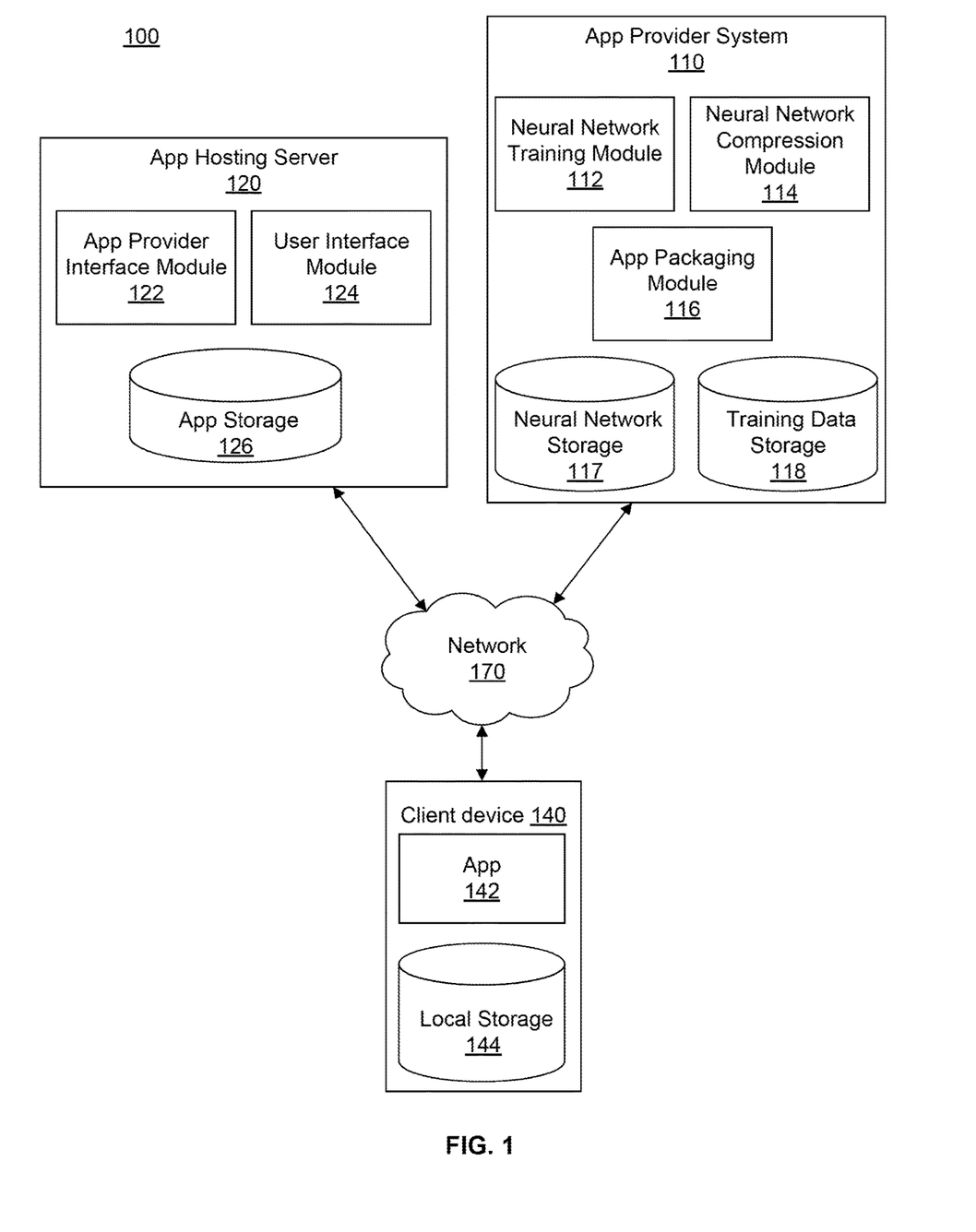
FIG. 1 is a high-level block diagram illustrating a networked computing environment in which neural networks may be used, according to one embodiment.

FIG. 1 illustrates one embodiment of a networked computing environment 100 in which neural network compression may be used. In the embodiment shown in FIG. 1, the networked computing environment 100 includes an application provider system 110, an application provider server 120, and a client device 140, all connected via a network 170. An application is also referred to herein as an app. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the application 142 directly from the application provider system 110, rather than from the application hosting server 120.

The application provider system 110 is one or more computer systems with which the provider of software (e.g., an application designed to run on a cell phone or tablet) develops that software. Although the application provider system 110 is shown as a single entity, connected to the network 170, for convenience, in many cases it will be made up from several software developer's systems (e.g., terminals) which may or may not all be network-connected.

In the embodiment shown in FIG. 1, the application provider system 110 includes a neural network training module 112, a neural network compression module 114, an application packaging module 116, neural network storage 117, and training data storage 118. In other embodiments, the application provider system 110 contains different and/or additional elements. In addition, the functions may be distributed among the elements in a different manner than described.

The neural network training module 112 is used to train neural networks. In one embodiment, the neural network training module 112 takes a set of training inputs that have known outputs (e.g., stored in the training data storage 118) and divides it into a training set and a validation set. The neural network is then trained using the training set (e.g., using a backpropagation algorithm) and then tested against the validation set to determine its accuracy after training. This process can be repeated using variations in the structure of the neural network and the results of validation compared across different neural networks to identify a neural network that is likely to reliably make the intended determination when presented with input data for which the correct output is already known.

For example, a neural network might be intended to identify faces in photographs. The training and validation sets would contain a variety of faces and instances of images including no face at all. The network is trained by adjusting parameters (e.g., node weightings) to minimize a loss function (i.e., a measure of the number and/or degree of errors) that results from applying the network to the training set. Once the neural network has been trained, it is applied to the validation set and the degree to which it successfully identifies faces is recorded. If the network makes few or no errors when applied to the validation set, this is a strong indicator that the network will correctly identify faces in photographs that have not already been classified.

The app packaging module 116 takes a lower-order representation of a neural network and packages it into an app to be provided to client devices 140. For example, the app packaging module 116 might be used to create an app for booking and managing trips with a ride-sharing service. In one embodiment, the app might include a neural network configured to take various data available at the client device 140 and predict whether the device is currently inside a vehicle providing a ride. The neural network may be too large to provide to client devices 140 over the network 170, so the app instead includes a lower-order representation that is sufficiently accurate to provide a good user experience. Once packaged, the app is made available to client devices 140 (e.g., via the app hosting server 120).

The neural network storage 117 and training data storage 118 include one or more computer-readable storage-media that are configured to store neural networks and training data, respectively. Although they are shown as separate entities in FIG. 1, this functionality may be provided by a single computer-readable storage-medium (e.g., a hard drive).

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 122 provides an interface with which app providers (e.g., the operator of app provider system 110) can add apps to a marketplace or other on-line store to make them available to users (either free or for payment of value). In one embodiment, an app provider fills out an on-line form with basic information about the app (e.g., name, app provider name, version number, a short description of what it does, and the like) and uploads the app in an appropriate format. The app provider interface module 114 adds the app (along with metadata with some or all of the information provided about the app) to app storage 126. In some cases, the app provider information module 114 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a user interface using which the users can search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In the embodiment shown in FIG. 1, the client device 140 includes an application 142 and local storage 144. The application 142 is one that uses a neural network to perform a task, such as one created by the application provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
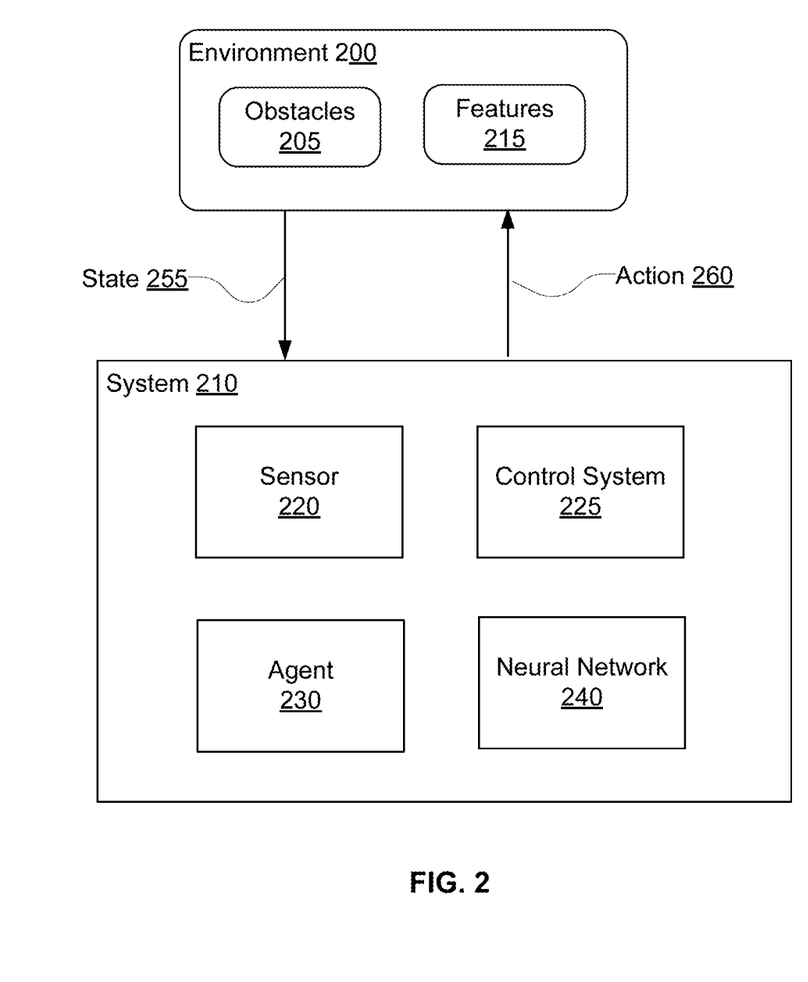
FIG. 2 illustrates a system environment comprising reinforcement learning based neural network, according to one embodiment.

FIG. 2 illustrates a system using reinforcement learning based neural network, according to one embodiment. The system 210 shown in FIG. 2 is a computing system that may be part of an apparatus or device that receives sensor data describing its environment and takes actions based on the sensor data, for example, a self-driving car or a robot. The environment 200 represents the surroundings of the system. For example, the environment 200 may represent a geographical region through which a self-driving car is travelling. Alternatively, the environment 200 may represent a maze or an obstacle course through which a robot is walking. As another example, the environment 200 may represent a setup of a game that the system 210 is playing, for example, an ATARI game.

The environment 210 may comprise obstacles 205 or features 215 that are detected by the system 210. The system 210 comprises one or more sensors 220, a control system 225, an agent 230, and a neural network 240. The system 210 uses the sensor 220 to sense the state 255 of the environment 200 and may perform certain actions 260. The actions 260 may cause the state of the environment to change. For example, the sensor 220 may be a camera that captures images of the environment. Other examples of sensors include a LIDAR, an infrared sensor, a motion sensor, a pressure sensor, or any other type of sensor that can provide information describing the environment 210 to the system 210. The agent 230 uses the neural network 240 to determine what action to take. The agent 230 sends signals to the control system 225 for taking the action 260. The neural network 240 is described in connection with FIG. 3.

For example, the sensors of a robot may identify an object. The agent of the robot invokes the neural network 240 to determine a particular action to take, for example, to move the object. The agent 230 of the robot sends signals to the control system 225 to move the arms of the robot to pick up the object and place it elsewhere. Similarly, a robot may use sensors to detect the obstacles surrounding the robot to be able to maneuver around the obstacles.

As another example, a self-driving car may capture images of the surroundings to determine a location of the self-driving car. As the self-driving car drives through the region, the location of the car changes and so do the surroundings of the car change. As another example, a system playing a game, for example, an ATARI game may use sensors to capture an image representing the current configuration of the game and make some move that causes the configuration of the game to change.

Figure 3:
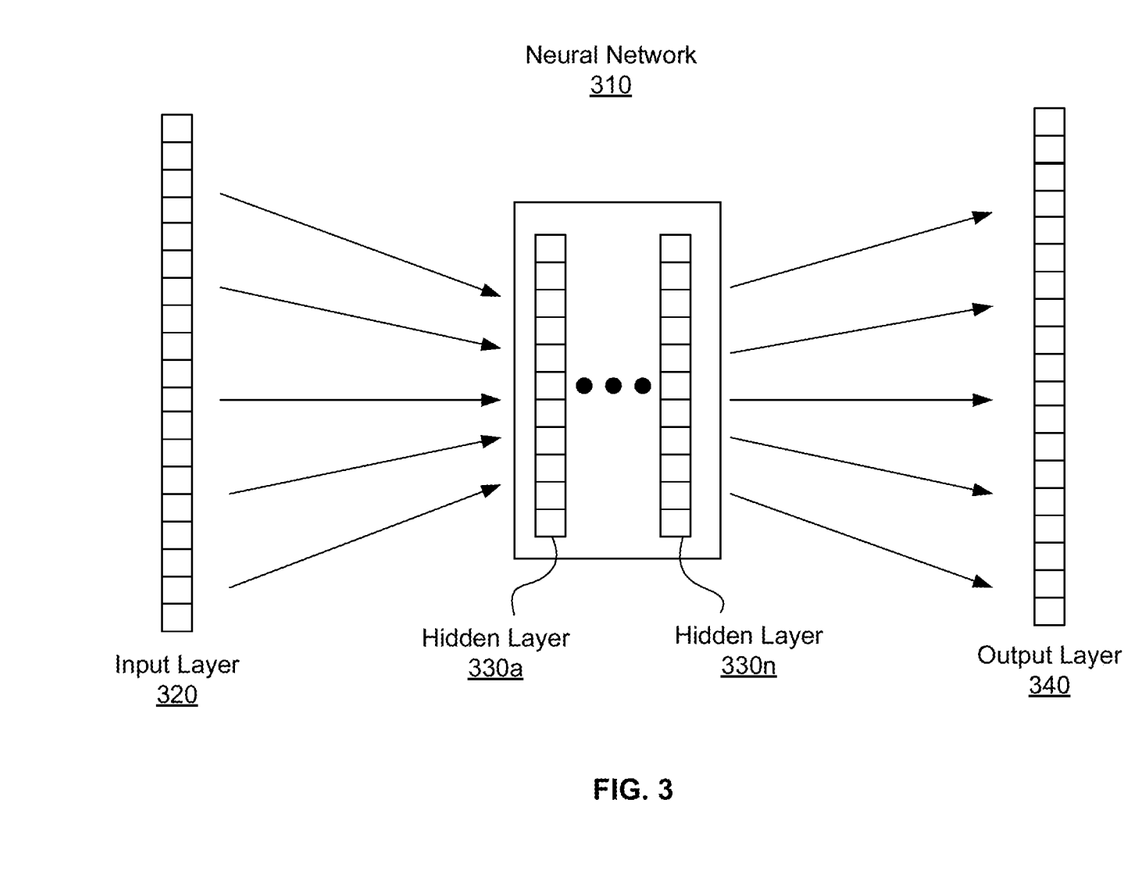
FIG. 3 is an example neural network, according to one embodiment.

FIG. 3 is an example neural network, according to one embodiment. The neural network 240 includes an input layer 320, one or more hidden layers 330a-n, and an output layer 340. Each layer of the neural network 240 (i.e., the input layer 320, the output layer 340, and the hidden layers 330a-n) comprises a set of nodes such that the set of nodes of the input layer 320 are input nodes of the neural network 240, the set of nodes of the output layer 340 are output nodes of the neural network 240, and the set of nodes of each of the hidden layers 330a-n are hidden nodes of the neural network 240.

Each node has one or more inputs and one or more outputs. Each of the one or more inputs to a node comprises a connection to an adjacent node in a previous layer and an output of a node comprises a connection to each of the one or more nodes in a next layer. The output of a node may be defined by an activation function that applies a set of weights to the inputs of the nodes of the neural network 240. In various embodiments, the output of a node is associated with a set of instructions corresponding to the computation performed by the node. Here, the set of instructions corresponding to the plurality of nodes of the neural network may be executed by one or more computer processors. The connections between nodes in the neural network 240 each is associated with a weight. In one or more embodiments, training the neural network 240 comprises adjusting values for weights of the neural network 300. The training of a neural network may be performed using a single processors based system or a parallel or distributed system that comprises a plurality of processors that interact with each other using interconnections between processors.

Distributed Architecture for Training Neural Network

Figure 4:
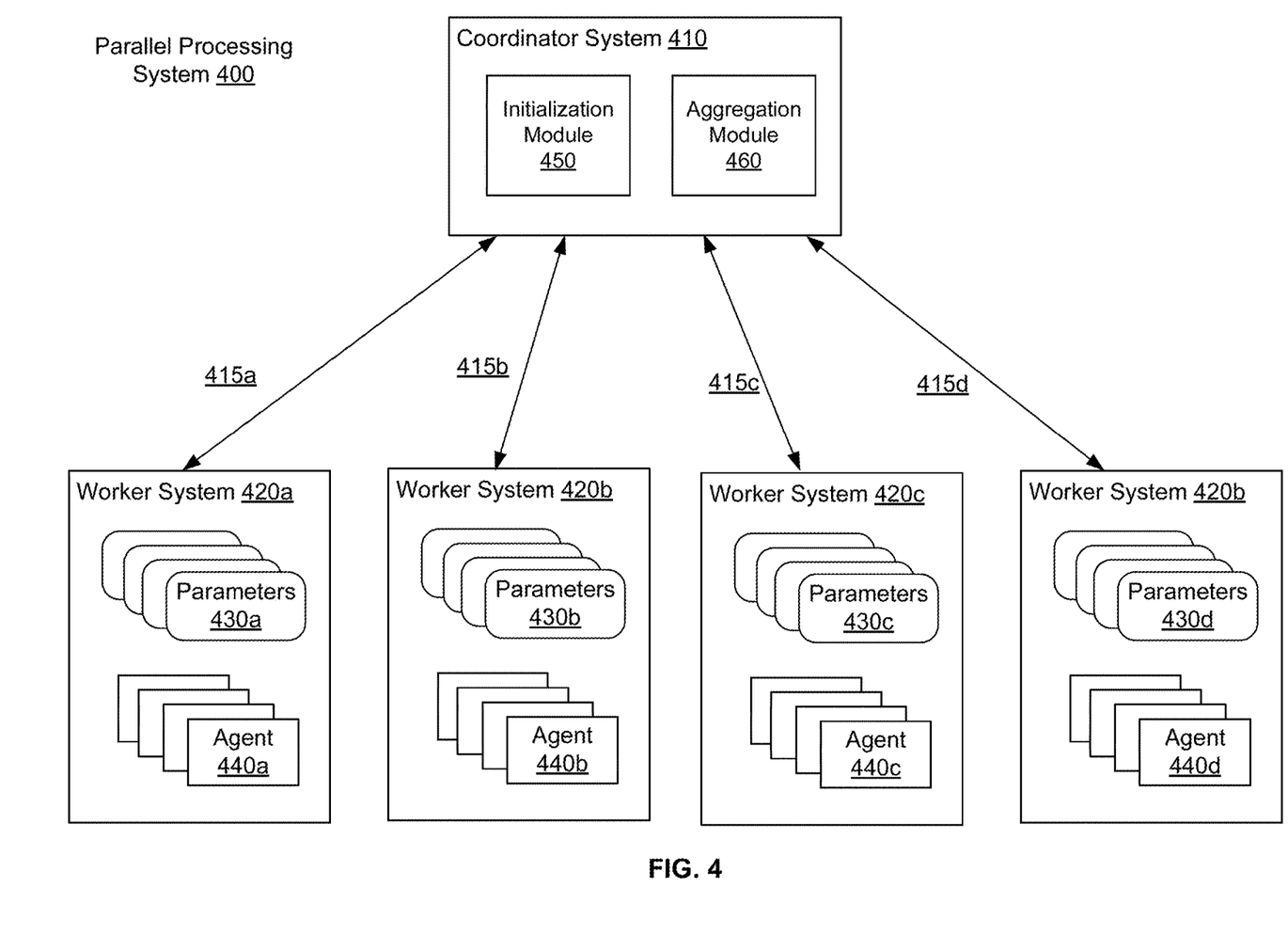
FIG. 4 is a parallel architecture for training a neural network, according to one embodiment.

FIG. 4 is an example parallel or distributed architecture for training a neural network, according to one embodiment. The parallel processing system 400 shown in FIG. 4 comprises a plurality of worker systems 420 and a coordinator system 410. The coordinator system 410 interacts 415 with the worker systems to provide them data such as parameter vectors for processing and receives results based on processing performed by the worker systems 420.

The training of a neural network may be performed over a population of parameter vectors, each parameter vector representing a set of weights for a neural network. As shown in FIG. 4, each worker system 420 may process a subset of the population comprising one or more parameter vectors 430. Each worker system 420 includes one or more agents 440 that process corresponding parameter vectors. Components such as sensors and control systems are not shown in FIG. 4 but may be part of the worker systems or the coordinator system 410.

The coordinator system 410 includes an initialization module 450 and a results collection module 460. Other embodiments may include more or different modules. The initialization module 450 initializes values that may be used by multiple worker systems. The results collection module 460 receives results from multiple worker systems, for example, for aggregating the results. For example, the coordinator system 410 may initialize a parameter vector and send to one or more worker systems 420. Each worker system 420 performs perturbations of the parameter vector to determine new parameter vectors and evaluate them. The worker system 420 may send one or more new parameter vectors obtained by perturbing the initial parameter vector and send them as results to the coordinator system 410. In an embodiment, the coordinator system 410 and the worker systems 420 encode a parameter vector for sending to a target system that may be another worker system or coordinator system. The encoded representation of a parameter vector is compresses and is efficient for transmitting over an interconnection network. The target system decodes the encoded parameter vector to obtain the parameter vector that was transmitted. This process is described in detail below.

Overall Process

Figure 5:
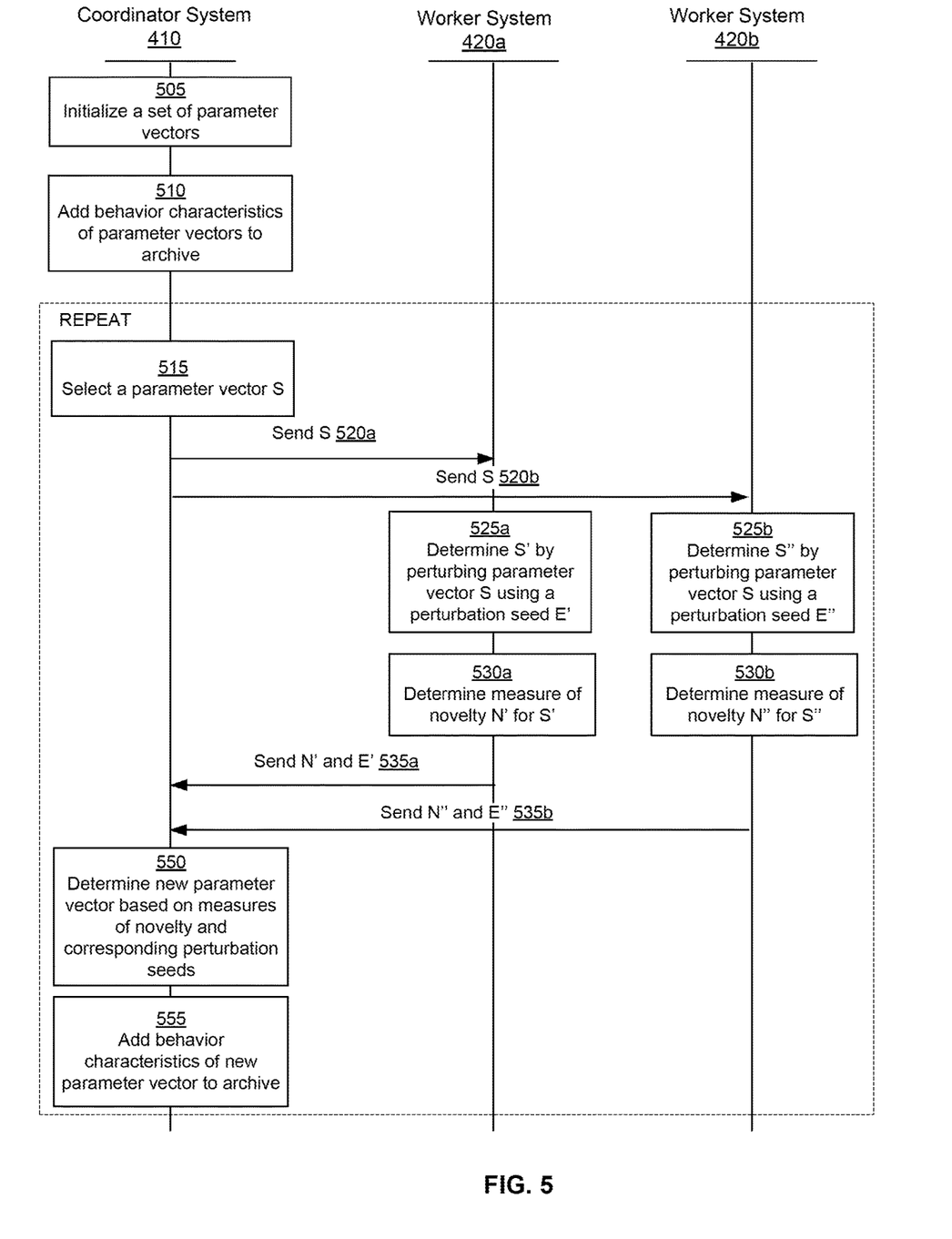
FIG. 5 is an interaction diagram illustrating the process for determining parameter vectors for a neural network based on novelty, according to one embodiment.

FIG. 5 is an interaction diagram illustrating the process for determining parameter vectors for a neural network based on novelty, according to one embodiment. The coordinator system 410 initializes 505 a set of parameters vectors for a neural network. The coordinator system 410 adds 510 behavior characteristics of parameters to an archive.

The coordinator system 410 and the worker systems 420 repeat the following steps. The coordinator system 410 selects a parameter vector S and sends the selected parameter vector S to each worker system 420. Each worker system 420 determines 525 a modified parameter vector by perturbing the received parameter vector S using a perturbation seed. Each worker system 420 further determines 530 a measure of novelty for the modified parameter vector. Each worker system sends 535 the determined measure of novelty and the corresponding perturbation seed to the coordinator system 410. The coordinator system 410 determines 550 a new parameter vector based on the values of measures of novelty and perturbation seeds received from the worker systems 420. The coordinator system 410 determines and adds 555 behavior characteristics of the new parameter vector to the archive. The steps 515, 520, 525, 530, 535, 550, and 555 are repeated for a plurality of iterations.

There are several manners in which a worker system 420 may determine 530 a measure of novelty for a modified parameter vector. As discussed above, measuring novelty, as opposed to (or in addition to) measuring solely for reward (or fitness) avoids deception formed by reaching a local optima. Inspired by nature's drive towards diversity, a novelty search encourages policies to engage in notably different behaviors than those previously seen. To this end, the worker systems may compute novelty of the current policy with respect to previously generated policies and then encourage the population distribution to move towards areas of parameter space with high novelty. As an example, a novelty search outperforms reward-based methods in maze and biped walking domains, which possess deceptive reward signals that attract agents to local optima.

In a novelty search (NS), a policy $\pi$ is assigned a domain-dependent behavior characterization $b(\pi)$ that describes its behavior. For example, in the case of a humanoid locomotion problem, $b(\pi)$ may be as simple as a two-dimensional vector containing the humanoid's final $\{x, y\}$ location. Throughout training, every $\pi_\theta$ evaluated adds a behavior characterization $b(\pi_\theta)$ to an archive set A with some probability. A particular policy's novelty N $(b(\pi_\theta), A)$ is then computed by selecting the k-nearest neighbors of $b(\pi_\theta)$ from A and computing the average distance between them, according to the following equations:

$$N(\theta, A) = N(b(\pi_\theta), A) = \frac{1}{|S|}\sum_{j \in S} \|b(\pi_\theta) - b(\pi_j)\|2$$

$$S = kNN(b(\pi_\theta), A) = \{b(\pi_1), b(\pi_2), \ldots, b(\pi_k)\}$$

Above, the distance between behavior characterizations is calculated with an L2-norm, but any distance function can be substituted.

In some embodiments, a worker may determine a measure of novelty by combining a novelty search with an evolution strategy (ES). As an introduction, an evolution strategy is a class of black box optimization inspired by natural evolution: At every iteration (generation), a population of parameter vectors (genomes) is perturbed (mutated) and, optionally, recombined (merged) via crossover. The fitness of each resultant offspring is then evaluated according to some objective function (reward) and some form of selection then ensures that individuals with higher reward tend to produce offspring for the next generation. In some embodiments, evolution strategy algorithms differ in their representation of the population and methods of recombination. Natural evolution strategies are a type of evolution strategy that represents the population as a distribution of parameter vectors $\theta$ characterized by parameters $\phi$: $p_\phi(\theta)$. Under a fitness function, $f(\theta)$, natural evolution strategy seeks to maximize the average fitness of the population, $\mathbb{E}_{\theta \sim p_\phi}[f(\theta)]$, by optimizing $\phi$ with stochastic gradient ascent. In some embodiments, a fitness function $f(\theta)$ represents the stochastic reward experienced over a full episode of agent interaction, where $\theta$ represents the parameters of a policy $\pi_\theta$. From the population distribution $p_{\phi_t}$, parameters $\theta_t^i \sim \mathcal{N}(\theta_t, \sigma^2 I)$ are sampled and evaluated to obtain $f(\theta_t^i)$. $\theta_t$ is updated using an estimate of approximate gradient of expected reward:

$$\nabla_\phi \mathbb{E}_{\theta \sim \phi}[f(\theta)] \approx \frac{1}{n}\sum_{i=1}^{n} f(\theta_t^i)\nabla_\phi \log p_\phi(\theta_t^i)$$

where n is the number of samples evaluated per generation. Intuitively, the natural evolution strategy samples parameters in the neighborhood of $\theta_t$ and determines the direction in which $\theta_t$ should move to improve expected reward. Since this gradient estimate has high variance, the natural evolution strategy relies on a large n for variance reduction. Generally, the natural evolution strategy also evolves the covariance of the population distribution, though in the embodiments described herein, static covariance distributions are described, meaning $\sigma$ is fixed throughout training.

In an embodiment, system 210 applies additive Gaussian noise to the current parameter vector: $\theta_t^i = \theta_t + \sigma \epsilon_i$ where $\epsilon_i \sim \mathcal{N}(0, I)$. The gradient is then estimated by taking a sum of sampled parameter perturbations weighted by their reward:

$$\nabla_{\theta_t} \mathbb{E}_{\epsilon \sim \mathcal{N}(0,I)}[f(\theta_t + \sigma \epsilon)] \approx \frac{1}{n\sigma}\sum_{i=1}^{n} f(\theta_t^i) \epsilon_i$$

To ensure that the scale of reward between domains does not bias the optimization process, in some embodiments, system 210 rank-normalizes $f(\theta_t^i)$ before taking the weighted sum. Overall, this natural evolution strategy variant exhibits performance on par with contemporary, gradient-based algorithms on difficult RL domains, including robot locomotion and Atari environments.

Going back to the worker determining a measure of novelty by combining a novelty search with an evolution strategy, in some embodiments, system 210 applies an evolution strategy optimization framework, described above, to compute and follow the gradient of expected novelty with respect to $\theta_t$. Such a Novelty Search-Evolution Strategy embodiment is referred to herein for short as "NS-ES." Given an archive A and sampled parameters $\theta_t^i = \theta_t + \sigma \epsilon_i$, system 210 computes a gradient estimate. The gradient estimate of the expected novelty for a perturbed parameter is determined as an aggregate of the products of the parameter value $N(\theta_t^i, A)$ before perturbation and the amount $\epsilon_i$ by which each parameter is perturbed:

$$\nabla_{\theta_t} \mathbb{E}_{\epsilon \sim \mathcal{N}(0,I)}[N(\theta_t + \sigma \epsilon, A) | A] \approx \frac{1}{n\sigma}\sum_{i=1}^{n} N(\theta_t^i, A) \epsilon_i$$

System 210 determines, based on the gradient estimate obtained, how to change the current policy's parameters $\theta_t$ to increase the average novelty of our parameter distribution. System 210 conditions the gradient estimate on A, as the archive is fixed at the beginning of a given iteration and updated only at the end. System 210 adds only the behavior characterization corresponding to each $\theta_t$, as adding those for each sample $\theta_t^i$ would inflate the archive and slow the nearest-neighbors computation. As more behavior characterizations are added to A, the novelty landscape changes, resulting in commonly occurring behaviors becoming "boring." Optimizing for expected novelty leads to policies that move towards unexplored areas of behavior space.

NS-ES could operate with a single agent that is rewarded for acting differently than its ancestors. However, to encourage additional diversity and get the benefits of population-based exploration, in some embodiments, system 210 creates a population of M agents, which we will refer to as the meta-population. Each agent, characterized by a unique $\theta^m$, is rewarded for being different from all prior agents in the archive (ancestors, other agents, and the ancestors of other agents). In some embodiments, the selection of M is domain dependent.

In some embodiments, system 210 initializes M random parameter vectors and, at each iteration, selects a parameter vector to update. System 210 probabilistically selects which $\theta^m$ to advance from a discrete probability distribution as a function of $\theta^m$'s novelty. Specifically, at every iteration, for a set of agent parameter vectors $\Pi=\{\theta^1, \theta^2, \ldots \theta^M\}$ system 210 calculates each $\theta^m$'s probability of being selected $P(\theta^m)$ as its novelty normalized by the sum of novelty across all policies:

$$P(\theta^m) = \frac{N(\theta^m, A)}{\sum_{j=1}^{M} N(\theta^j, A)}$$

Having multiple, separate agents represented as independent Gaussians is a simple choice for the meta-population distribution (i.e. how the meta-population distribution is represented). However, in some embodiments, system 210 employs more complex sampling distributions that represent the multi-modal nature of meta-population parameter vectors.

After selecting an individual m from the meta-population, system 210 computes the gradient of expected novelty with respect to m's current parameter vector, $\theta_t^m$, and performs an update accordingly:

$$\theta_{t+1}^m \leftarrow \theta_t^m + \alpha \frac{1}{n\sigma} \sum_{i=1}^{n} N(\theta_t^{i,m}, A)\epsilon_i$$

Where n is the number of sampled perturbations to $\theta_t^m$, $\alpha$ is the step-size, and $\theta_t^{i,m} = \theta_t^m + \sigma\epsilon_i$, where $\epsilon_i \sim \mathcal{N}(0, I)$. In response to determining that the current parameter vector is updated, system 210 computes $b(\pi_{\theta_{t+1}^m})$ and adds it to the shared archive A with probability 1. The whole process is repeated for a pre-specified number of iterations, as there is no true convergence point of NS. System 210 returns the highest-performing parameter vector found. Advantageously, the addition of the archive and the replacement of the fitness function with novelty does not damage the scalability of the evolution strategy optimization procedure.

Figure 6:
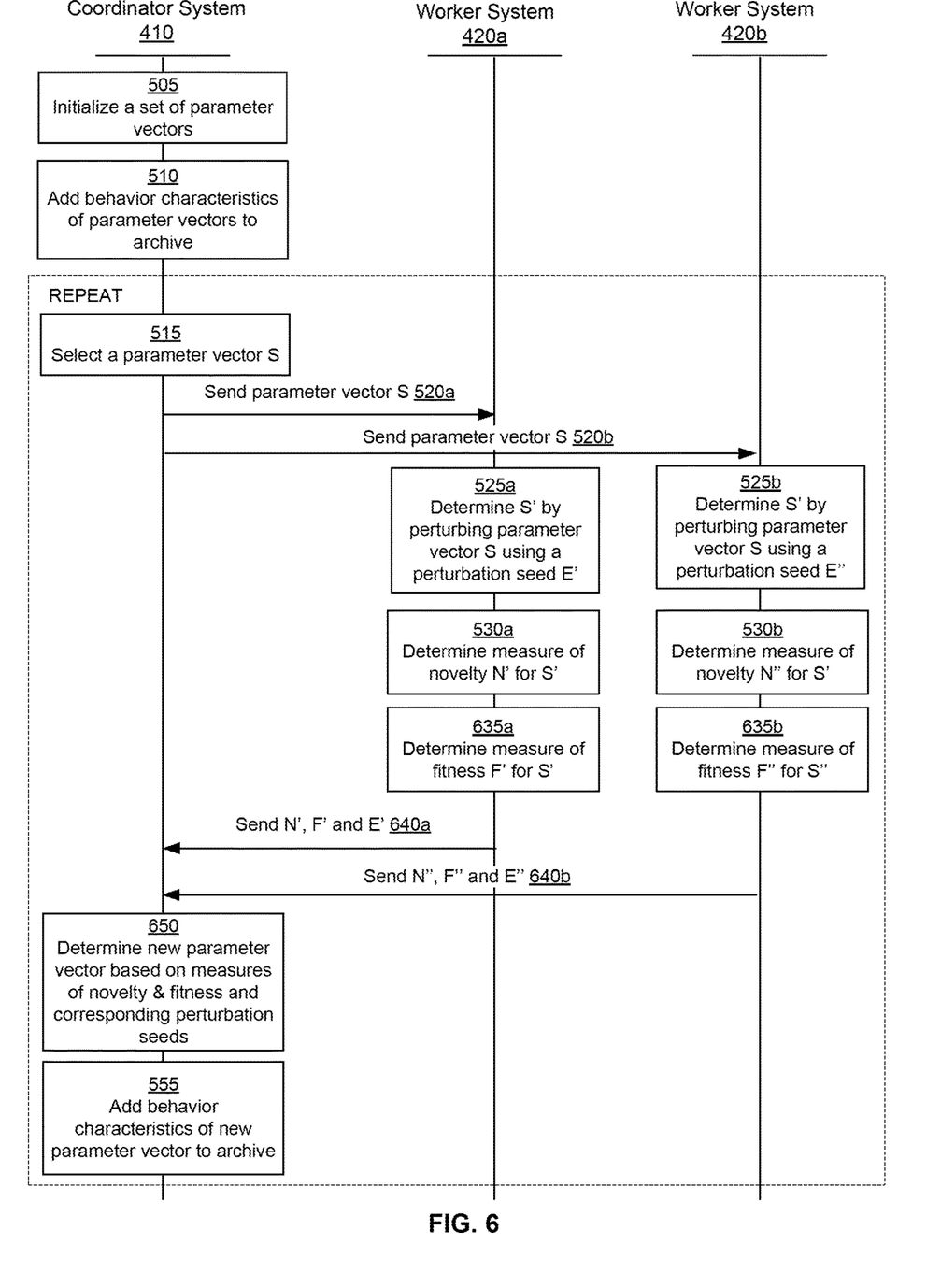
FIG. 6 is an interaction diagram illustrating the process for determining parameter vectors for a neural network based on novelty and fitness, according to one embodiment.

FIG. 6 is an interaction diagram illustrating the process for determining parameter vectors for a neural network based on novelty and fitness, according to one embodiment. The coordinator system 410 and the worker systems 420 perform the steps 505, 510, 515, 520, 525, 530 as described in connection with FIG. 5. Each worker system 420 further determines 635 a measure of fitness for the modified parameter vector. Each worker system 420 sends 640 the measure of novelty, the perturbation seed, and the measure of fitness to the coordinator system 410. The coordinator system 410 determines 650 a new parameter vector based on the values of measures of novelty, measures of fitness, and perturbation seeds received from the worker systems 420. The coordinator system 410 determines and adds 555 the behavior characteristics of the new parameter vector to the archive. The steps 515, 520, 525, 530, 635, 640, 650, and 555 are repeated for a plurality of iterations.

While NS-ES alone can enable agents to avoid deceptive local optima in the reward function, reward signals are still very informative and discarding them completely may cause performance to suffer. Consequently, system 210 ma'y train $^t$ a variant of NS-ES, referred to as NSR-ES (Novelty Search Reward-Evolution Strategy), that combines the reward ("fitness") and novelty calculated for a given set of policy parameters $\theta$. To this end, each worker system 420 may determine 635 the measure of fitness using NSR-ES, as described below, and may determine 360 the new parameter vector therefrom. Similar to NS-ES and ES, NSR-ES operates on entire episodes and can thus evaluate reward and novelty simultaneously for any sampled parameter vector: $\theta_t^{i,m} = \theta_t^m + \epsilon_i$. Specifically, system 210 may compute $f(\theta_t^{i,m})$ and $N(\theta_t^{i,m}, A)$, average the two values, and set the average as the weight for the corresponding $\epsilon_i$. System 210 integrates the averaging process into the parameter update rule as:

$$\theta_{t+1}^m \leftarrow \theta_t^m + \alpha \frac{1}{n\sigma} \sum_{i=1}^{n} \frac{f(\theta_t^{i,m}) + N(\theta_t^{i,m}, A)}{2} \epsilon_i$$

Intuitively, the algorithm follows the approximated gradient in parameter-space towards policies that both exhibit novel behaviors and achieve high rewards. Often, however, the scales of $f(\theta)$ and $N(\theta, A)$ differ. To combine the two signals effectively, system 210 rank-normalizes $f(\theta_t^{i,m})$ and $N(\theta_t^{i,m}, A)$ independently before computing the average.

NSR-ES has an equal weighting of the performance and novelty gradients that is static across training. System 210 may implement a further extension of NSR-ES called NSR Adapt-ES (NSRA-ES), whi$^r$ch takes advantage of the opportunity to dynamically weight the priority given to the performance gradient $f(\theta_t^{i,m})$ vs. the novelty gradient $N(\theta_t^{i,m})$ by intelligently adapting a weighting parameter $\omega$ during training. By doing so, system 210 can follow the performance gradient when it is making progress, increasingly try different things if stuck in a local optimum, and switch back to following the performance gradient once unstuck. For a specific $\omega$ at a given generation, the parameter update rule for NSRA-ES is expressed as follows:

$$\theta_{t+1}^m \leftarrow \theta_t^m + \alpha \frac{1}{n\sigma} \sum_{i=1}^{n} \omega f(\theta_t^{i,m})\epsilon_i + (1-\omega)N(\theta_t^{i,m}, A)\epsilon_i$$

System 210 may set $\omega=1.0$ initially, and may decrease $\omega$ if performance stagnates across a fixed number of generations. System 210 continues decreasing $\omega$ until performance increases, at which point system 210 increases $\omega$.

Real-World Examples

An example of applying the above-described techniques is where a robot takes sensor input, such as camera input or LIDAR input, to determine what action to take. As an example, in a maze scenario, a robot may be programmed to approach a target goal, and there may be obstacles between the robot and the target goal, such as a wall, where to cross the wall, the robot must first move further away from the goal to go around the wall. In such a scenario, applying a reward-only search, the robot will approach the point of the wall nearest to the goal, and then be stuck at that local optima. Applying a novelty-only search, the robot will move away from known points (e.g., the point of the wall nearest to the goal) to explore new grounds. However, if the maze has most points of novelty in a direction away from the goal, then the robot may not end up getting any closer to the goal. Applying a combined reward-novelty search, the robot will seek out new parts of the maze that go closest to the goal.

Another example of applying the above-described techniques is within a video game context, such as within the context of Atari 2600 games. In these games, an agent is programmed to maximize the score reported by the game, and there may be enemies or obstacles that prevent the agent from achieving high scores. In some games, applying a reward-only search will lead to scenarios in which the agent will take actions that lead to a high score quickly, but ultimately lead to a local optimum, preventing the accrual of any more reward. Applying a novelty-only search may prevent a convergence to a local optimum, but will not encourage the agent to take actions that lead to high-game scores. Applying a combined reward-novelty search, specifically one that adaptively changes the agent's preference for either novelty or reward will lead to behaviors that will have high game scores and avoid local optima.

Additional examples include any task that involves an agent learning to act in a feedback-based system via reinforcement learning. This may include autonomous vehicles navigating city streets, agents in a marketplace simulation optimizing for profit, a route planner selecting an optimal route from one location to another, and the like.

Computing System Architecture

Figure 7:
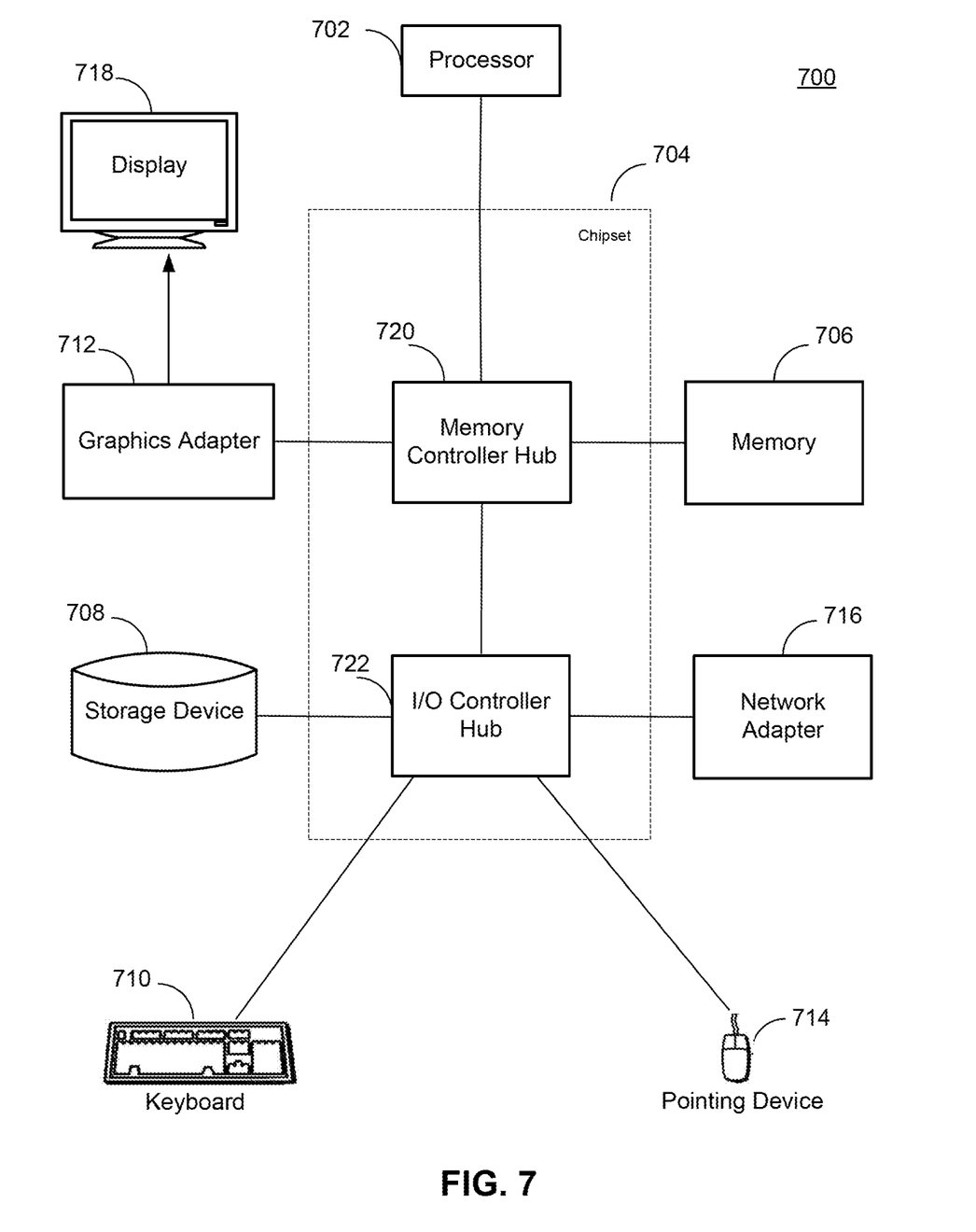
FIG. 7 is a high-level block diagram illustrating an example of a computer suitable for use in the system environment of FIG. 1-2, according to one embodiment.

FIG. 7 is a high-level block diagram illustrating an example computer 700 suitable for use as a client device 140, application hosting server 120, or application provider system 110. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks (e.g., network 170).

The types of computers used by the entities of FIG. 1 can vary depending upon the embodiment and the processing power required by the entity. For example, the application hosting server 120 might include a distributed database system comprising multiple blade servers working together to provide the functionality described. Furthermore, the computers can lack some of the components described above, such as keyboards 710, graphics adapters 712, and displays 718.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A computer-implemented method comprising:
initializing a set of parameter vectors for a neural network;
determining behavior characterizations for the set of parameter vectors;
storing the determined behavior characterizations in an archive;
selecting a parameter vector from the set of parameter vectors;
generating a plurality of copies of the selected parameter vector;
generating a plurality of modified parameter vectors by perturbing each copy of the copies of the selected parameter vector with a different perturbation seed of a plurality of perturbation seeds;
determining, for each respective one of the plurality of the modified parameter vectors, a respective measure of novelty by:
selecting k-nearest neighbors of the behavior characterization associated with the respective modified parameter vector; and
computing the average distance between the behavior characterization of the respective modified parameter vector and the selected k-nearest neighbors;
determining, for each respective one of the plurality of the modified parameter vectors, a probability by computing each respective one of the plurality of the modified parameter vector's novelty normalized by the sum of novelty across the plurality of the modified parameter vectors;
selecting, based on the determined probabilities, a modified parameter vector of the plurality of modified parameter vectors as a new selected parameter vector;
performing an update to the new selected parameter vector by computing a gradient of expected novelty with respect to the new selected parameter vector, resulting in an updated parameter vector;
determining behavior characterization of the updated parameter vector; and
storing the behavior characterization of the updated parameter vector in the archive.

2. The computer-implemented method of claim 1, wherein determining, for each respective one of the plurality of modified parameter vectors, a respective measure of novelty comprises, for a respective modified parameter vector of the plurality of modified parameter vectors:
extracting a parameter of the respective modified parameter vector;
comparing the parameter to each corresponding parameter of each parameter vector of the set of parameter vectors;
determining a degree to which the parameter corresponds to each corresponding parameter; and
determining the respective measure of novelty based on the degree to which the parameter corresponds to each corresponding parameter.

3. The computer-implemented method of claim 2, wherein the respective measure of novelty has an inverse correlation to the degree to which the parameter corresponds to each corresponding parameter.

4. The computer-implemented method of claim 1, further comprising:
determining, for each respective one of the plurality of modified parameter vectors, a respective measure of fitness, wherein determining the new selected parameter vector is further based on each respective measure of fitness for each respective one of the plurality of modified parameter vectors.

5. The computer-implemented method of claim 4, wherein determining, for each respective one of the plurality of modified parameter vectors, a respective measure of fitness comprises, for a respective modified parameter vector of the plurality of modified parameter vectors:
executing the neural network corresponding to the modified parameter vector;
determining a result value based on the output of executing the neural network; and
determining a measure of reward based on a comparison of the result value to a target result value.

6. The computer-implemented method of claim 4, wherein determining the new selected parameter vector comprises:
applying a first weighting to each respective one of the plurality of modified parameter vectors based on the respective measure of fitness, and applying a second weighting to each respective one of the plurality of modified parameter vectors based on the respective measure of novelty; and
determining the new selected parameter vector based on the applied weightings.

7. The computer-implemented method of claim 1, further comprising:
receiving sensor data from one or more sensors, wherein the set of parameter vectors is derived from the sensor data; and
performing an action based on output of the neural network, wherein the output comprises the behavior characteristics of the new parameter vector.

8. The computer-implemented method of claim 1, wherein generating the plurality of modified parameter vectors comprises:
transmitting each respective copy of the plurality of copies of the parameter vector to a different respective worker system of a plurality of worker systems, wherein each respective worker system of the plurality of worker systems generates each modified parameter vector of the plurality of modified parameter vectors.

9. A non-transitory computer-readable storage medium storing executable computer program code that, when executed by one or more processors, cause the one or more processors to perform operations comprising:
initializing a set of parameter vectors for a neural network;
determining behavior characterizations for the set of parameter vectors;
storing the determined behavior characterizations in an archive;
selecting a parameter vector from the set of parameter vectors;
generating a plurality of copies of the selected parameter vector;
generating a plurality of modified parameter vectors by perturbing each copy of the copies of the selected parameter vector with a different perturbation seed of a plurality of perturbation seeds;
determining, for each respective one of the plurality of the modified parameter vectors, a respective measure of novelty by:
selecting k-nearest neighbors of the behavior characterization associated with the respective modified parameter vector; and computing the average distance between the behavior characterization of the respective modified parameter vector and the selected k-nearest neighbors;

determining, for each respective one of the plurality of the modified parameter vectors, a probability by computing each respective one of the plurality of the modified parameter vector's novelty normalized by the sum of novelty across the plurality of the modified parameter vectors;

selecting, based on the determined probabilities, a modified parameter vector of the plurality of modified parameter vectors a new selected parameter vector;

performing an update to the new selected parameter vector by computing a gradient of expected novelty with respect to the new selected parameter vector, resulting in an updated parameter vector;

determining behavior characterization of the updated parameter vector; and storing the behavior characterization of the updated parameter vector in the archive.

10. The non-transitory computer-readable storage medium of claim 9, wherein determining, for each respective one of the plurality of modified parameter vectors, a respective measure of novelty comprises, for a respective modified parameter vector of the plurality of modified parameter vectors:

extracting a parameter of the respective modified parameter vector;

comparing the parameter to each corresponding parameter of each parameter vector of the set of parameter vectors;

determining a degree to which the parameter corresponds to each corresponding parameter; and determining the respective measure of novelty based on the degree to which the parameter corresponds to each corresponding parameter.

11. The non-transitory computer-readable storage medium of claim 10, wherein the respective measure of novelty has an inverse correlation to the degree to which the parameter corresponds to each corresponding parameter.

12. The non-transitory computer-readable storage medium of 9, wherein the program code, when executed by the one or more processors, further causes the one or more processors to perform operations comprising:

determining, for each respective one of the plurality of modified parameter vectors, a respective measure of fitness, wherein determining the new selected parameter vector is further based on each respective measure of fitness for each respective one of the plurality of modified parameter vectors.

13. The non-transitory computer-readable storage medium of claim 12, wherein determining, for each respective one of the plurality of modified parameter vectors, a respective measure of fitness comprises, for a respective modified parameter vector of the plurality of modified parameter vectors:

executing the neural network corresponding to the modified parameter vector;

determining a result value based on the output of executing the neural network; and determining a measure of reward based on a comparison of the result value to a target result value.

14. The non-transitory computer-readable storage medium of claim 12, wherein determining the new selected parameter vector comprises:

applying a first weighting to each respective one of the plurality of modified parameter vectors based on the respective measure of fitness, and applying a second weighting to each respective one of the plurality of modified parameter vectors based on the respective measure of novelty; and determining the new selected parameter vector based on the applied weightings.

15. The non-transitory computer-readable storage medium of claim 9, wherein the program code, when executed by the one or more processors, further causes the one or more processors to perform operations comprising:

receiving sensor data from one or more sensors, wherein the set of parameter vectors is derived from the sensor data; and performing an action based on output of the neural network, wherein the output comprises the behavior characteristics of the new parameter vector.

16. The non-transitory computer-readable storage medium of claim 9, wherein generating the plurality of modified parameter vectors comprises:

transmitting each respective copy of the plurality of copies of the parameter vector to a different respective worker system of a plurality of worker systems, wherein each respective worker system of the plurality of worker systems generates each modified parameter vector of the plurality of modified parameter vectors.

17. A computer system comprising memory with instructions encoded thereon, and one or more processors that, when executing the instructions, are caused to perform operations comprising:

initializing a set of parameter vectors for a neural network;

determining behavior characterizations for the set of parameter vectors;

storing the determined behavior characterizations in an archive;

selecting a parameter vector from the set of parameter vectors;

generating a plurality of copies of the selected parameter vector;

generating a plurality of modified parameter vectors by perturbing each copy of the copies of the selected parameter vector with a different perturbation seed of a plurality of perturbation seeds;

determining, for each respective one of the plurality of the modified parameter vectors, a respective measure of novelty by:

selecting k-nearest neighbors of the behavior characterization associated with the respective modified parameter vector; and computing the average distance between the behavior characterization of the respective modified parameter vector and the selected k-nearest neighbors;

determining, for each respective one of the plurality of the modified parameter vectors, a probability by computing each respective one of the plurality of the modified parameter vector's novelty normalized by the sum of novelty across the plurality of the modified parameter vectors;

selecting, based on the determined probabilities, a modified parameter vector of the plurality of modified parameter vectors a new selected parameter vector;

performing an update to the new selected parameter vector by computing a gradient of expected novelty with respect to the new selected parameter vector, resulting in an updated parameter vector;

determining behavior characterization of the updated parameter vector; and storing the behavior characterization of the updated parameter vector in the archive.

18. The computer system of claim 17, wherein determining, for each respective one of the plurality of modified parameter vectors, a respective measure of novelty comprises, for a respective modified parameter vector of the plurality of modified parameter vectors:
- extracting a parameter of the respective modified parameter vector;
- comparing the parameter to each corresponding parameter of each parameter vector of the set of parameter vectors;
- determining a degree to which the parameter corresponds to each corresponding parameter; and
- determining the respective measure of novelty based on the degree to which the parameter corresponds to each corresponding parameter.

* * * * *

UNITED STATES PATENT AND TRADEMARK OFFICE
CERTIFICATE OF CORRECTION

| | | |
|---|---|---|
| PATENT NO. | : 11,068,787 B2 | Page 1 of 1 |
| APPLICATION NO. | : 16/220533 | |
| DATED | : July 20, 2021 | |
| INVENTOR(S) | : Conti et al. | |

It is certified that error appears in the above-identified patent and that said Letters Patent is hereby corrected as shown below:

In the Claims

In Column 15, in Claim 9, Line 12, delete "vectors a" and insert -- vectors as a --, therefor.

In Column 15, in Claim 12, Line 42, delete "of 9," and insert -- of claim 9, --, therefor.

In Column 16, in Claim 17, Line 61, delete "vectors a" and insert -- vectors as a --, therefor.

Signed and Sealed this
Fifteenth Day of August, 2023

*Katherine Kelly Vidal*

Katherine Kelly Vidal
*Director of the United States Patent and Trademark Office*